(12) United States Patent
Assa et al.

(10) Patent No.: US 6,947,996 B2
(45) Date of Patent: Sep. 20, 2005

(54) METHOD AND SYSTEM FOR TRAFFIC CONTROL

(75) Inventors: Eyal Assa, Rod Hasharon (IL); David Berechya, Tel Mond (IL)

(73) Assignee: Seabridge, Ltd., Hod Hasharon (IL)

(*) Notice: Subject to any disclaimer, the term of this patent is extended or adjusted under 35 U.S.C. 154(b) by 697 days.

(21) Appl. No.: 09/771,906

(22) Filed: Jan. 29, 2001

(65) Prior Publication Data

US 2002/0147829 A1 Oct. 10, 2002

(51) Int. Cl.[7] .................................................. G06F 15/16
(52) U.S. Cl. ........................................ 709/232; 709/203
(58) Field of Search .................. 709/232; 370/230–234

(56) References Cited

U.S. PATENT DOCUMENTS

| | | | |
|---|---|---|---|
| 5,541,912 A | | 7/1996 | Choudhury et al. .......... 370/17 |
| 5,602,830 A | * | 2/1997 | Fichou et al. ................ 370/232 |
| 5,764,641 A | | 6/1998 | Lin ............................. 370/412 |
| 5,901,139 A | | 5/1999 | Shinohara .................... 370/232 |
| 5,901,147 A | | 5/1999 | Joffe ........................... 370/412 |
| 5,903,735 A | * | 5/1999 | Kidder et al. ................ 709/240 |
| 5,926,459 A | * | 7/1999 | Lyles et al. .................. 370/230 |
| 5,936,949 A | * | 8/1999 | Pasternak et al. ........... 370/328 |
| 5,940,833 A | * | 8/1999 | Benson ........................ 707/100 |
| 5,946,346 A | * | 8/1999 | Ahmed et al. ............... 375/219 |
| 6,014,367 A | | 1/2000 | Joffe ........................... 370/230 |
| 6,034,945 A | | 3/2000 | Hughes et al. .............. 370/230 |
| 6,038,217 A | * | 3/2000 | Lyles ........................... 370/233 |
| 6,044,060 A | | 3/2000 | Jones .......................... 370/230 |
| 6,049,527 A | | 4/2000 | Isoyama et al. ............. 370/235 |
| 6,076,112 A | | 6/2000 | Hauser et al. ............... 709/234 |
| 6,081,504 A | | 6/2000 | Tanaka et al. ............... 370/230 |
| 6,091,708 A | | 7/2000 | Matsunuma .................. 370/233 |
| 6,091,725 A | | 7/2000 | Cheriton et al. ............. 370/392 |
| 6,229,813 B1 | * | 5/2001 | Buchko et al. .............. 370/412 |

* cited by examiner

*Primary Examiner*—Anthony Knight
*Assistant Examiner*—Michael B. Holmes
(74) *Attorney, Agent, or Firm*—Fitch, Even, Tabin & Flannery (57) ABSTRACT

A traffic control method and system are disclosed for scheduling fixed size traffic elements from a number of queues for transmission on a link. Each queue has associated traffic parameters. The system comprises a scheduler and a calendar in a memory for storing a transmission schedule of the queues. The scheduler shapes the transmission schedule by updating the schedule in the calendar in dependence on inputted traffic parameters of each queue. The system also includes an amplifier to amplify the traffic parameters by a factor K prior to input to the scheduler, the scheduler and calendar being adapted to operate using the amplified parameters.

33 Claims, 4 Drawing Sheets

METHOD AND SYSTEM FOR TRAFFIC CONTROL

FIELD OF THE INVENTION

The present invention is in the general field of traffic control and in particular relates to a method and system suitable for traffic control of cell-based traffic in transmission systems such as asynchronous rafer mode (AT) based networks.

BACKGROUND OF THE INVENTION

Various systems have been adopted to carry digitally-encoded signals for communication applications, such as telephone, video, and data services. These systems are often connection-oriented packet mode transmission systems, such as Asynchronous Transfer Mode (AT) systems, fame relay systems, X.25 systems, or other transmission Systems. Connection-oriented systems (e.g., ATM systems) are employed in private and public communication systems or networks to transfer packetized signals (e.g., data cells or protocol data units) across communication lines, such as telephone lines, cables, optical fibers, air waves, satellite links, or other communication media.

ATM networks transfer fixed size data cells or units via virtual connections or channels. Data cells can represent voice, sound, video, graphics, data, or combinations thereof for use in computing or communication applications. A connection could occupy a full physical link or may be part of a single physical link carrying a number of virtual connections.

Traffic management is critical to the successful operation of cell-based transmission in ATM-based networks. Cell-based transmission systems are subject to congestion caused by unpredictable statistical fluctuations of traffic flows and fault conditions within the network. Congestion of such systems refers to the state of network devices, such as switches, in which the device is not able to meet the negotiated network performance objectives for the already established connections and/or for the new connection requests. In the absence of effective traffic management, traffic loads from users can exceed the capacity of the network, resulting in an overall degradation of network performance and the loss of data. Traffic management is required in cell based networks as well as in packet based network. Traffic management maintains QoS (Quality of Service) of traffic across network elements such as switches. Where congestion occurs, traffic management allows selected traffic to be discarded in order to keep to an agreed traffic contract and to maintain traffic efficiency.

In an ATM-based network for example, the traffic control strategy is based on determining whether an ATM connection can be accommodated by the network and negotiating the performance parameters that will be supported. Traffic parameters describe the traffic characteristics of an ATM connection. For example, traffic parameters may describe peak cell rate (PCR), cell delay variation (CDV), cell delay variation tolerance (CDVT), burst tolerance (BT), sustainable cell rate (SCR),. When a user requests a new ATM connection the user must specify the traffic parameters for that connection. The user specifies the traffic parameters by selecting a QOS from the QOS classes provided by the network. A connection is accepted by the network if the necessary resources are available to support the traffic level while maintaining the agreed upon QOS for existing connections. A similar process is performed for other network types that offer quality of service guarantees.

Where a connection is established, the network and the user enter into a "contract". The contract refers to the negotiated characteristics of an ATM connection and includes the conformance definition that is used to unambiguously specify the behaviour level the connection's cells should reach if they are to be defined as conforming cells. The agreed QOS should be provided by the network for as long as the user complies with the traffic contract, that is cells are defined as conforming.

A contract may be for one of a number of predefined service classes. Service classes include constant bit rate (CBR) and variable bit rate (VBR).

The constant bit rate service class (CBR) is intended to support real-time applications that require a fixed quantity of bandwidth during the existence of the connection and low cell delay variation. A quality of service is negotiated to provide the CBR service, where the QoS parameters include the peak cell rate (PCR) and the cell delay variation tolerance (CDVT). Conventional ATM traffic management schemes for CBR classes guarantee that the user-contracted QoS is maintained in order to support, for example, real-time applications, such as circuit emulation and voice/video applications, which require tightly constrained delay variations. A CBR class often requires that a connection is able to send a specific number of cells or bits per second A CBR class connection must have a set end-to-end bandwidth.

The variable bit rate (VBR) service class is intended to support applications where the resulting network traffic can be characterized as hang frequent data bursts. The VBR class QoS parameters include peak cell rate (PCR), a sustainable cell rate (SCR), cell delay variation tolerance (CDVT) and maximum burst tolerance (BT). Although the VBR class has somewhat more flexible timing requirements than the CBR class, the VBR class must still meet timing requirements.

ATM switches frequently employ FIFO (First In-First Out) output buffers to implement queues of cells waiting to be processed. The processing may include multiplexing the cells onto a shared link, for example. The outputs from these buffers are essentially time multiplexed composites of the input flows that are loaded into them. Of course, these output flows are time delayed relative to the input flows because of the inherent latency of the buffers. Moreover, the cell delay variation (CDV) of one or more of these output flows may be increased if scheduling conflicts occur among the data transport limits of the different flows because these conflicts cause so-called "transmit collisions".

It will be appreciated that increased CDV is especially troublesome for traffic, such as CBR traffic, which often has a relatively tight CDV tolerance. Thus, if each hop between a source and a destination includes a simple FIFO output queue of the foregoing type, it may be necessary to limit the number of hops this CDV sensitive traffic is permitted to make in order to ensure compliance within its specified tolerance.

In order to space out bursty traffic and ensure a data source satisfies contracted connection parameters with the data it transmits, a process called shaping is performed on the output of many network devices. A shaper in a network functions to regulate traffic in a bursty network by using queues to absorb incoming bursts and then transmit the traffic in a regulated manner.

ITU-T Recommendation I.371 addresses the possibility of reshaping traffic at a network element for the purpose of bringing the traffic into conformance with a traffic descriptor in the following terms:

"Traffic shaping is a mechanism that alters the traffic characteristics of a stream of cells on a VCC or a VPC to achieve a desired modification of those traffic characteristics, in order to achieve better network efficiency whilst meeting the QoS objectives or to ensure conformance at a subsequent interface. Traffic shaping must maintain cell sequence integrity on an ATM connection. Shaping modifies traffic characteristics of a cell flow with the consequence of increasing the mean cell transfer delay."

Traffic shaping may be used for, for example, peak cell rate reduction, burst length limitation, and reduction of CDV by suitably spacing cells in time and queue service schemes.

Shaping for CBR classes is often implemented using a single leaky bucket algorithm whilst a dual leaky bucket algorithm is used for VBR classes.

The leaky bucket algorithm operates on the basis that traffic cells are queued in a buffer and scheduled in a periodic manner. A number of variables dependent on the traffic class of a connection are used to calculate the regular time slots in which the connection's cells can be transmitted. Unlike traffic multiplexing algorithms and other schedulers, shapers will insert delays between cells if this is necessary to space cells to satisfy contractual requirements.

In order to implement efficient shapers, the leaky bucket algorithms are implemented in logic embedded into, for example, application specific integrated circuits (ASICs) or field programmable gate arrays (FPGAs). High-speed network devices must select a cell for transmission every few microseconds and this requires the logic to operate at exceptional high speeds. Obviously this speed requirement severely restricts the complexity of the algorithm and its implementation. Due to the required simplistic implementation only small sized variables can be used in the calculation. Reducing the size of the variables reduces the accuracy of the numbers they can store. This typically limits the variables used in the algorithms to integers or numbers with few decimal placed. Where reduced accuracy variables are used, a corresponding drop in the accuracy of the calculation can be seen. This results in traffic that is not evenly spaced or which does not meet, contractual requirements even though it has been shaped. There is therefore a trade-off between the accuracy of variables and their corresponding effect on the accuracy of the algorithm and the speed of the shaper.

Accordingly, that there is a need for more accurate traffic shaping methods and systems suitable for use in high speed ATM switches and other network devices.

SUMMARY OF THE INVENTION

The present invention seeks to provide an improved accuracy method and system for controlling traffic in communication networks such as ATM networks. The present invention offers an improvement to the single and dual leaky bucket algorithms that is high in accuracy, supports a large number of connections, is of high speed and can be implemented using a low number of logic elements in an ASIC or FPGA environment.

According to one aspect of the present invention, there is provided a traffic control system for scheduling fixed size traffic elements from a number of queues for transmission on a link, each queue having associated traffic parameters, the system comprising a scheduler and a calendar in a memory for storing a transmission schedule of the queues, the scheduler shaping the transmission schedule by updating the schedule in the calendar in dependence on inputted traffic parameters of each queue, wherein the system includes an amplifier to amplify the traffic parameters by a factor K prior to input to the scheduler, the scheduler and calendar being adapted to operate using the amplified parameters.

By modifying a traffic control system to accommodate parameters of higher magnitude than normal without more complex memories or similar, higher accuracy calculation is achieved without increasing the complexity of the calculation itself or of the overall system.

Preferably, the system further comprises a parameter memory arranged to store the amplified parameters as integers for input to the scheduler. The traffic parameters may include quality of service parameters.

The transmission schedule for a respective queue is preferably updated after a transmission from the queue. The calendar may comprise a linear array having a number of indices, each index corresponding to a transmission time and being capable of referencing a list of queues, queues referenced by a low value index being transmitted before queues referenced by a higher value index, wherein the updating of the transmission schedule comprises the recalculation of the index to refer to the queue.

Preferably, the scheduler recalculates the index using leaky bucket shaping. The scheduler may use single leaky bucket shaping for queues having CBR class traffic. The traffic parameters may comprise the inverse of the respective queue's peak cell rate (1/PCR) and the queue's cell delay variation tolerance (CDVT), the parameters being calculated as:

$$I = \text{Integer}\left\{\frac{LinkPCR[cells/s]}{QPCR[cells/s]} * K\right\}$$

$$L = \text{Integer}\{CDVT[\text{sec}] * LinkPCR * K\},$$

where LinkPCR is the PCR of the link and QPCR is the PCR of the respective queue.

Preferably, the scheduler uses dual leaky bucket shaping for queues having VBR class traffic. The traffic parameters for the first leaky bucket may comprise the inverse of the respective queue's peak cell rate (1/PCR) and the queue's cell delay variation tolerance (CDVT), the parameters being calculated as:

$$I = \text{Integer}\left\{\frac{LinkPCR[cells/s]}{QPCR[cells/s]} * K\right\}$$

$$L = \text{Integer}\{CDVT[\text{sec}] * LinkPCR * K\},$$

and the traffic parameters for the second leaky bucket may comprise the inverse of the respective queue's sustainable cell rate (1/SCR) and the sum of the queue's cell delay variation tolerance (CDVT) and burst tolerance (BT), the parameters being calculated as:

$$I = \text{Integer}\left\{\frac{LinkPCR[cells/s]}{QPCR[cells/s]} * K\right\}$$

$$L = \text{Integer}\{BT[\text{sec}] * LinkPCR * K\} + \text{Integer}\{CDVT[\text{sec}] * LinkPCR * K\},$$

where LinkPCR is the PCR of the link and QPCR is the PCR of the respective queue.

Preferably, the control system further comprises a transmitter arranged to traverse the array from lowest index to highest traversing one index per transmission time, wherein the transmitter allows a queue to transmit if it is referenced by the index currently traversed.

Recalculation of the index may result in the reference to the queue being moved to an index with a higher value.

A recalculation resulting in an index value greater than the maximum index of the array may be adjusted so as to wrap around the array.

Preferably, the system further comprises a memory for storing the number of transmission times passed since each queue's last transmission, the value being used as a traffic parameter input to the scheduler.

The traffic control system may comprise a Field Programmable Gate Array (FPGA) or an application specific integrated circuit (ASIC).

According to another aspect of the present invention, there is provided a traffic control method scheduling fixed size traffic elements from a number of queues for transmission on a link, each queue having associated traffic parameters, the method comprising the steps of:
storing a transmission schedule of the queues in a memory;
shaping the transmission schedule by updating the schedule in the calendar in dependence on inputted traffic parameters of each queue;
wherein the step of shaping includes the step of amplifying the traffic parameters by a factor K, the memory and the shaping step being adapted to operate using the amplified parameters.

Preferably, the amplified parameters are truncated as integers.

The traffic parameters may include quality of service parameters.

Preferably, the transmission schedule comprises a linear array having a number of indices, each index corresponding to a transmission time and being capable of referencing a list of queues, queues referenced by a low value index being transmitted before queues referenced by a higher value index, wherein the step of shaping includes the step of recalculating the value of the index that should refer to the queue.

The step of shaping may comprise leaky bucket shaping. Single leaky bucket shaping may be used for queues having CBR class traffic, in which case the traffic parameters comprise the inverse of the respective queue's peak cell rate (1/PCR) and the queue's cell delay variation tolerance (CDVT), the parameters being calculated as:

$$I = \text{Integer}\left\{\frac{LinkPCR[cells/s]}{QPCR[cells/s]} * K\right\}$$

$L=\text{Integer}\{CDVT[\text{sec}]*LinkPCR*K\}$, where LinkPCR is the PCR of the ink and QPCR is the PCR of the respective queue.

Dual leaky bucket shaping may be used for queues having VBR class traffic, in which case the traffic parameters for the first leaky bucket comprise the inverse of the respective queue's peak cell rate (1/PCP) and the queue's cell delay variation tolerance (CDVT), the parameters being calculated as:

$$I = \text{Integer}\left\{\frac{LinkPCR[cells/s]}{QPCR[cells/s]} * K\right\}$$

$L=\text{Integer}\{CDVT[\text{sec}]*LinkPCR*K\}$, and the traffic parameters for the second leaky bucket comprise the inverse of the respective queue's sustainable cell rate (1/SCR) and the sum of the queue's cell delay variation tolerance (CDVT) and burst tolerance (BT), the parameters being calculated as:

$$I = \text{Integer}\left\{\frac{LinkPCR[cells/s]}{QPCR[cells/s]} * K\right\}$$

$L=\text{Integer}\{BT[\text{sec}]*LinkPCR*K\}+\text{Integer}\{CDVT[\text{sec}]*LinkPCR*K\}$ where LinkPCR is the PCR of the link and QPCR is the PCR of the respective queue.

Preferably, the method further comprises the step of traversing the array from the lowest index to the highest, traversing one index per transmission time, further comprising the step of allowing a queue to transmit if it is referenced by the index currently traversed.

Recalculation of the index results in the reference to the queue being moved to an index with a higher value.

A recalculation resulting in an index value greater than the maximum index of the array is adjusted so as to wrap around the array.

The method may further comprise the step of storing the number of transmission times passed since each queue's last transmission, the value being used as a traffic parameter input.

BRIEF DESCRIPTION OF THE DRAWINGS

For a better understanding, the invention will now be described, by way of example only, with reference to the accompanying drawings, in which.

DETAILED DESCRIPTION OF A PREFERRED EMBODIMENT

Figure 1:
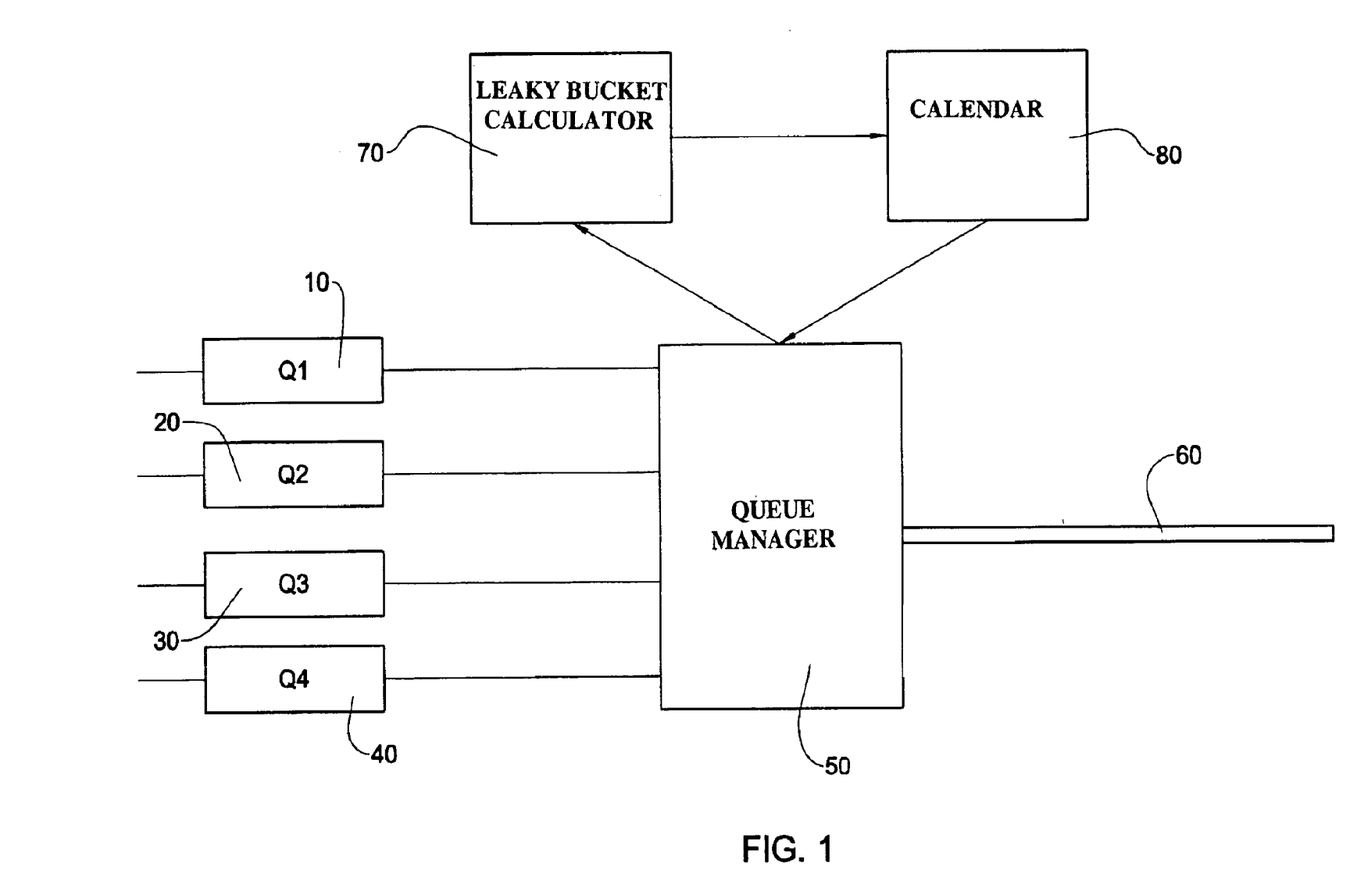
FIG. 1 is a schematic diagram of a traffic control system according to the present invention.

FIG. 1 is a schematic diagram of a traffic control system according to the present invention.

Traffic queues Q1 to Q4 (designated 10 to 40) are linked to queue manager 50. The queue manager 50 is configured to multiplex and shape the traffic from the queues 10–40 onto an outgoing link 60. In the following examples it is assumed that the sum of the bandwidth of the traffic on the incoming queues 10–40 is less than the bandwidth of the outgoing link 60. Therefore there should be no contention once the traffic queues are shaped. The queue manager 50 includes a leaky bucket calculator 70 and a calendar 80.

The scheduled transmission order of the queues is stored in the calendar 80. The calendar is a linear array with size of $2^n$ in which each index represents a potential transmission time. If a queue is scheduled for transmission at that time, the queue is referenced by the corresponding array index. If there is more than queue scheduled for transmission at one time, the first queue linked to the index array is selected for transmission and the references to the other queues are moved to the next array index, thereby scheduling them for the next transmission time.

When a cell is transmitted from a queue, the queue manager 50 triggers the leaky bucket calculator 70. If the class of the connection associated with the queue from which transmission has been made is CBR then a single leaky bucket algorithm is used. If the class of the connection is VBR then a dual; leaky bucket algorithm is used. The results of the leaky bucket calculator are used to update the calendar to give the queue's next transmission time. The result is the index position the reference to the queue should be repositioned to within the array.

FIG. 2 is a series of block diagrams illustrating the operation of a calendar for use in the present invention.

Figure 2A:
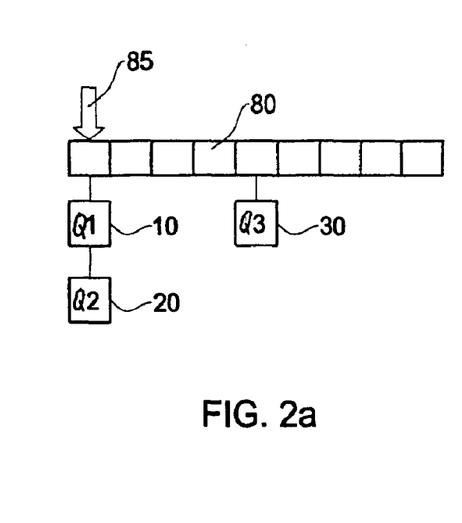
FIG. 2 is a series of block diagrams illustrating the operation of a calendar for use in the present invention.

As mentioned above, the calendar 80 is a linear array. FIGS. 2a to 2e illustrate the calendar, each Figure corresponding to a transmission time. A pointer 85 is maintained to point to the array index corresponding to the current transmission time. In FIG. 2a, Q1 (10) and Q2 (20) are scheduled for transmission at the current transmission time. Q1 (10) is selected for transmission as it is the first queue referenced. The reference to Q2 (20) is then moved along one array index to the position shown in FIG. 2b. In this simplified example it is assumed that each queue has only 1 cell for transmission and therefore is not rescheduled.

Figure 2B:
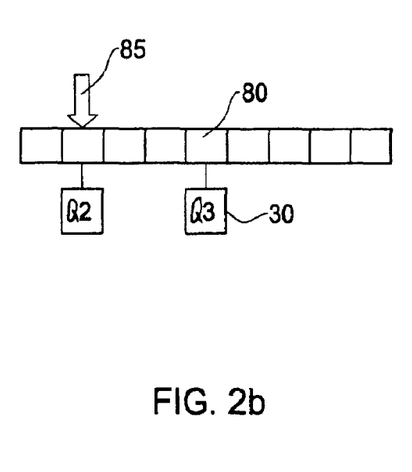
Figure 2C:
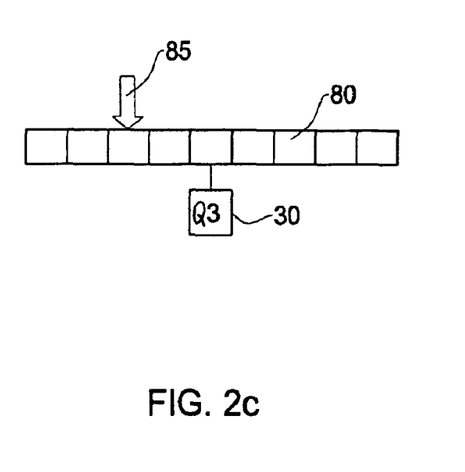
Figure 2D:
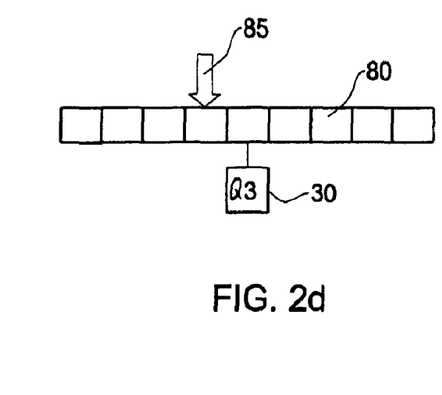
Figure 2E:
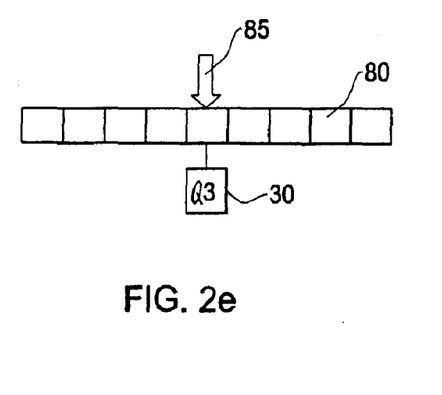

In FIG. 2b, the pointer is incremented by one array index to the next transmission time, from which Q2 (20) is selected for transmission. It can be seen in FIGS. 2c and 2d that no queues are referenced by the array indices for those particular transmission times and therefore nothing is transmitted. Finally, Q3 (30) is selected for transmission in FIG. 2e. This would therefore result in a shaped output on an output link of Q1 Q2—Q3.

Figure 3:
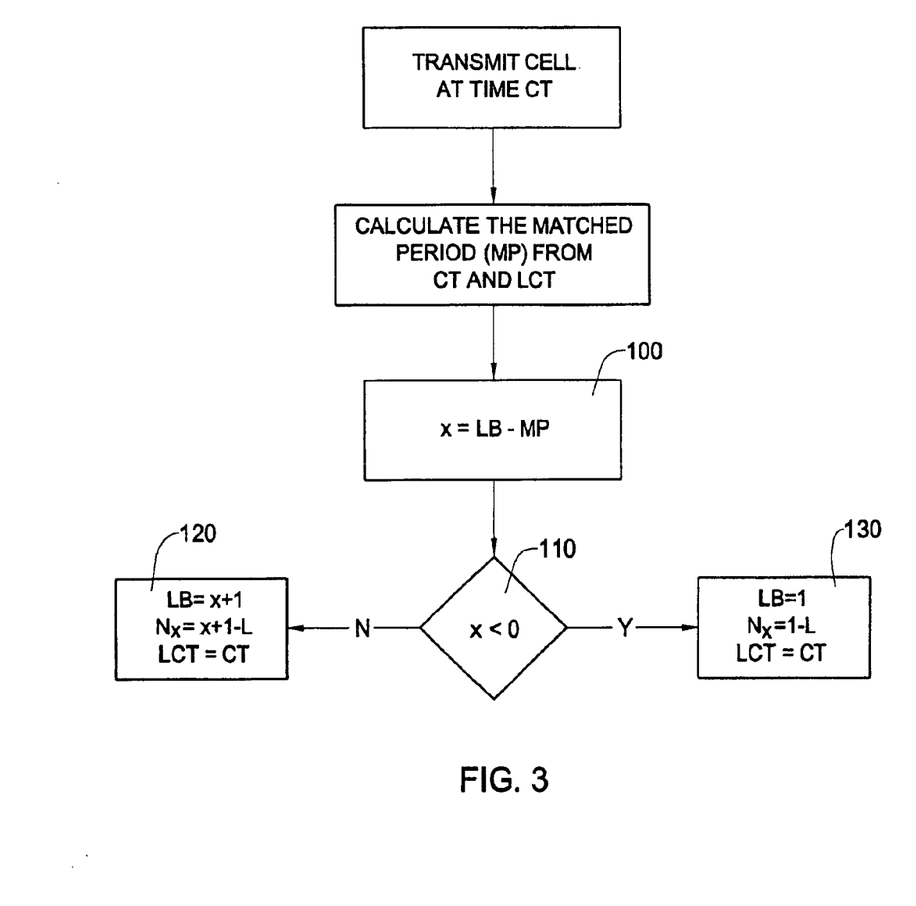
FIG. 3 is a flow diagram illustrating the operation of a leaky bucket algorithm for use in the present invention; and, FIG. 4 is a flow diagram illustrating the use of a matched period (MP) used in the leaky bucket algorithm in the present invention.

FIG. 3 is a flow diagram illustrating the operation of a leaky bucket algorithm according to the present invention.

The leaky bucket algorithm calculates the next transmission time $N_x$ using a leaky bucket variable LB, parameters I and L and a time counter CT. A last transmission time variable LCT (Last Completion Time) is maintained for each queue.

The parameters I and L used by the leaky bucket algorithm depend on the class of traffic being processed.

For CBR class traffic, I=1/PCR and is calculated as shown above, and L=CDVT and is calculated as shown above. The result of the algorithm gives the next transmission time for the queue. Once this has been calculated the calendar 80 is updated accordingly.

For VBR class traffic, a first pass using the leaky bucket algorithm is made with I=1/PCR, and is calculated as shown above and L=CDVT and is calculated as shown above, followed by a second pass using I=1/SCR and is calculated as shown above and L=BT+CDVT and is calculated as shown above. In operation, the two passes are executed simultaneously. The maximum value of the obtained from the two passes is selected as the next transmission time. The calendar 80 is updated with this value.

In step 100, a temporary variable x is assigned the difference between LB and a matched period, MP. MP is calculated from CT and LCT and is discussed in more detail below with reference FIG. 4. At step 110, it is determined if x is less than 0. If so, at step 120 LB is set to I, $N_x$ to (I–L) and LCT is set to CT. If x is greater than or equal to 0, at step 130 LB is set to x+I, $N_x$ to x+I–L and LCT to CT.

Separate leaky bucket variables LB1, LB2 are used where there is a first and second leaky bucket passes.

In the present invention time is measured and calculated in units of 1/LinkPCR, that is the inverse of the outgoing link's peak cell rate. As LinkPCR is the frequency of which a cell can be transmitted on the link it corresponds to a transmission time and therefore one array index of the calendar 80. Therefore the value calculated by the leaky bucket algorithm(s) gives the array index the queue should be rescheduled to.

In order to permit a simple implementation in hardware with minimum logic elements, the parameters and variables are implemented as integers. However, so as to avoid reducing accuracy, the parameters and variables (1/PCR, CDVT, 1/SCR, BT, LB1, LB2) used are amplified by a factor K before being turned into an integer. Therefore the parameters become:

$$I \text{ (for leaky bucket 1)} = \text{Integer}\left\{\frac{LinkPCR[cells/s]}{QPCR[cells/s]} * K\right\}$$

$$L \text{ (for leaky bucket 1)} = \text{Integer}\{CDVT[\text{sec}] * LinkPCR * K\}$$

$$I \text{ (for leaky bucket 2)} = \text{Integer}\left\{\frac{LinkPCR[cells/s]}{QSCR[cells/s]} * K\right\}$$

$$L(\text{for leaky bucket 2}) = \text{Integer}\{BT[\text{sec}]*LinkPCR*K\} + \text{Integer}\{CDVT[\text{sec}]*LinkPCR*K\},$$

where QPCR is the PCR of the respective queue's connection and QSCR is the SCR of the respective queue's connection.

Each of the above parameters and LB1 and LB2 are binary numbers with size of (n+$\log_2$ K).

In this manner at least a portion the accuracy of non-integer parameters can be retained without having to store the non-integers themselves.

The granularity of PCR (i.e. the difference between adjacent PCR supported) is less then:

$$\frac{LinkPCR}{K+1}$$

The minimum PCR that can be supported is determined by the size of the calendar array and the LinkPCR:
Min PCR=LinkPCR/Array Size.
For example, to support a connection of 64 kb/s (telephony channel) in a port of 155 Mb/s (LinkPCR) we need a linear array of at least length 155/0.064=2421.

The minimum SCR that can be supported depends on the array size, LinkPCR, MBS and 1/PCR[in sub units of link-cell-time]=Integer {1420000/114140*1024)=12739 CDVT [in sub units of link-cell-time]=Integer {$1*10^{-6}$ *1420000*1024}=1454

The second connection is of VBR class and has the parameters:
QPCR=114.14 Kcells/sec (approx 50 Mb/s)
QSCR=2290 cells/sec (approx 5 Mb/s)
CDVT=1 μs
BT=3851 μs (Maximum Burst Size–MBS=10)
LinkPCR=1420 Kcells/sec.
Therefore,
1/PCR[in sub units of link-cell-time]=Integer {1420000/ 114140*1024)=12739
CDVT[in sub units of link-cell-time]=Integer {$1*10^{-6}$ *1420000*1024}=1454
1/SCR[in sub units of link-cell-time]=Integer {(1420000/ 2290*1024)=634969
BT [in sub units of link-cell-time]=Integer {$3851*10^{-6}$ *1420000*1024}=5599662
The link onto which the queue contents are to be multiplexed is an STM4 link running at 622 Mb/s. Therefore, 1/LinkPCR=1420 Kcells/sec.

Table 1 shows the scheduling of transmissions and associated parameter values for the first connection and Table 2 shows this information for the second connection.

TABLE 1

| CT | LCT | MP | LB | x | nLB | Xn | Reschedule Index |
|---|---|---|---|---|---|---|---|
| 0 | 0 | 0 | 0 | 0 | 12739 | 11285 | 11 |
| 23 | 0 | 23552 | 12739 | −10813 | 12739 | 11285 | 34 |
| 34 | 23 | 11264 | 12739 | 1475 | 14214 | 12760 | 46 |
| 46 | 34 | 12288 | 14214 | 1926 | 14665 | 13211 | 58 |
| 58 | 46 | 12288 | 14665 | 2377 | 15116 | 13662 | 71 |
| 71 | 58 | 13312 | 15116 | 1804 | 14543 | 13089 | 83 |
| 83 | 71 | 12288 | 14543 | 2255 | 14994 | 13540 | 96 |
| 96 | 83 | 13312 | 14994 | 1682 | 14421 | 12967 | 108 |

CT and Reschedule Index are Indices in the array. Each index in the array corresponds to 1/LinkPCR, 704 ns. For example, the difference between CT=23 and CT=34 in second is: 11×704=7.74 us

TABLE 2

| CT | LCT | MP | LB1 | LB2 | X1 | X2 | nLB1 | nLB2 | Xn1 | Xn2 | Reschedule Index |
|---|---|---|---|---|---|---|---|---|---|---|---|
| 0 | 0 | 0 | 0 | 0 | 0 | 0 | 12739 | 634969 | 11285 | −4964693 | 11 |
| 11 | 0 | 11264 | 12739 | 634969 | 1475 | 623705 | 14214 | 1258674 | 12760 | −4340988 | 23 |
| 23 | 11 | 12288 | 14214 | 1258674 | 1926 | 1246386 | 14665 | 1881355 | 13211 | −3718307 | 35 |
| 35 | 23 | 12288 | 14665 | 1881355 | 2377 | 1869067 | 15116 | 2504036 | 13662 | −3095626 | 48 |
| 48 | 35 | 13312 | 15116 | 2504036 | 1804 | 2490724 | 14543 | 3125693 | 13089 | −2473969 | 60 |
| 60 | 48 | 12288 | 14543 | 3125693 | 2255 | 3113405 | 14994 | 3748374 | 13540 | −1851288 | 73 |
| 73 | 60 | 13312 | 14994 | 3748374 | 1682 | 3735062 | 14421 | 4370031 | 12967 | −1229631 | 85 |
| 85 | 73 | 12288 | 14421 | 4370031 | 2133 | 4357743 | 14872 | 4992712 | 13418 | −606950 | 98 |
| 98 | 85 | 13312 | 14872 | 4992712 | 1560 | 4979400 | 14299 | 5614369 | 12845 | 14707 | 112 |
| 112 | 98 | 14336 | 14299 | 5614369 | −37 | 5600033 | 12739 | 6235002 | 11285 | 635340 | 732 |
| 732 | 112 | 634880 | 12739 | 6235002 | −622141 | 5600122 | 12739 | 6235091 | 11285 | 635429 | 1352 |
| 1352 | 732 | 634880 | 12739 | 6235091 | −622141 | 5600211 | 12739 | 6235180 | 11285 | 635518 | 1972 |
| 1972 | 1352 | 634880 | 12739 | 6235180 | −622141 | 5600300 | 12739 | 6235269 | 11285 | 635607 | 2592 |
| 2592 | 1972 | 634880 | 12739 | 6235269 | −622141 | 5600389 | 12739 | 6235358 | 11285 | 635696 | 3212 |
| 3212 | 2592 | 634880 | 12739 | 6235358 | −622141 | 5600478 | 12739 | 6235447 | 11285 | 635785 | 3832 |

In this example we see a VBR connection with a burst of 10 cells. PCR (the space between cells within the burst) is 12≅13 index spaces, about 8.8 us. After burst period the space between cells is 620 index spaces which is about 436.5 us.

It will be appreciated that, especially once the amplification factor is applied, even large arrays will be quickly exhausted when cells are scheduled for transmission every 10, 100 or 1000 transmission times. In one example of the present invention, this is overcome by allowing the calendar to wrap around. Thus, if the calculated next transmission time N exceeds the maximum index value in the calendar the calculated next transmission time N becomes N−maximum calendar index value. In general, the value of LB will not exceed L+I, in the case of a long silence where the time between two consecutive cells is more then $2^m \times 1$ LinkPCR, the value of LB can be L+2I. m has to be large enough to ensure that $2_m \times 1/\text{LinkPCR} \gg$ maximum silence expected. Once CT reaches $2^{m-1}$, it is reset to 0.

However, by allowing CT to wrap around, an account of the time since the last transmission of the queue must be maintained in the vent of long silences. This is done by maintaining a variable MP, matched period. CT is the current time in units of 1/LinkPCR, LCT is the Last Completion time also in units of 1/LinkPCR. The maximum value of CT and LCT is $2^m-1$. The low n bits of CT are the current index of the array (m should be larger then n). MP is the difference between CT and LCT multiplied by the amplification factor, K. The reason for the multiplication by K is that the units of the parameters using by the algorithm are 1/(LinkPCR*K).

Figure 4:
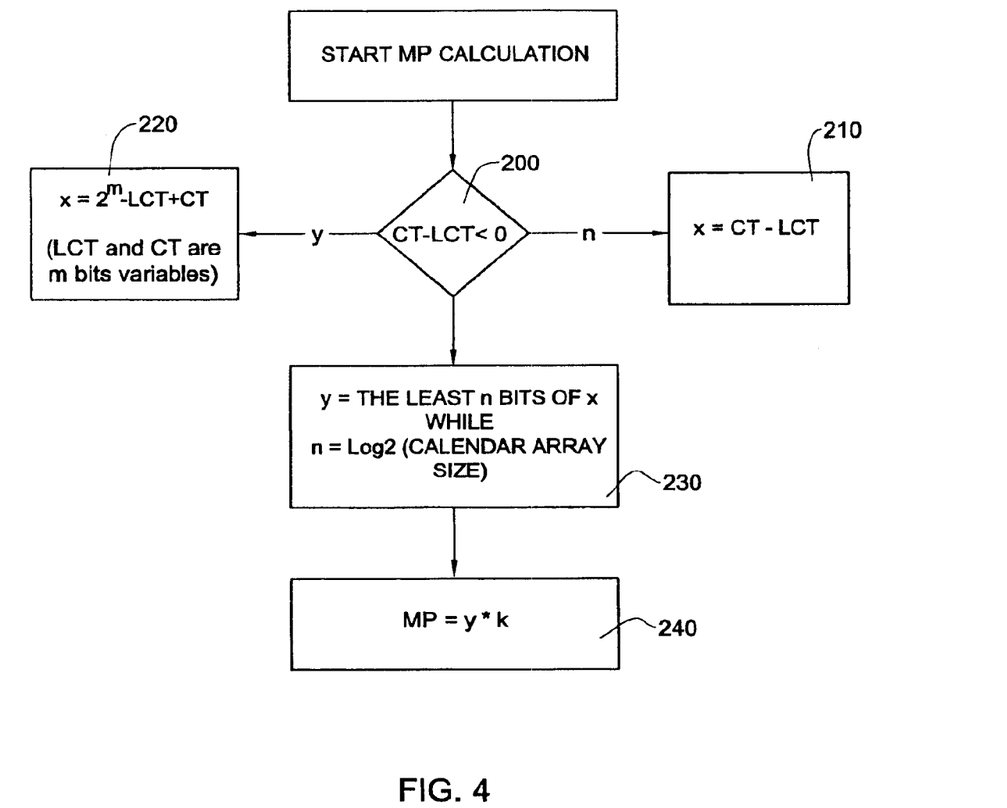

FIG. 4 is a flow diagram illustrating the calculation of the matched period MP.

In step 200 we check if CT=LCT is less then 0, if yes we go to step 220 and calculate x by subtracting LCT from $2^m$ and adding CT, x is the period between LCT and CT. If no, we go to step 210 and calculate x by subtracting LCT from CT. In either case, at step 230, y, the least n bits of x are calculated. In step 240 y is multiplied by the amplification factor, K, to obtain MP. MP's bit size is same as LB1, LB2, 1/PCR, 1/SCR, BT and CDVT which is: $n+\log_2(K)$.

The present invention has been described with a certain degree of particularity but various alternations and modifications may be carried out without departing from the spirit and scope of the following claims:

What is claimed is:

1. A traffic shaping device or use in packet switched communication system for scheduling fixed size traffic elements from a number of queues for transmission on a link, each queue having associated traffic parameters, the system comprising a scheduler and a calendar in a memory for storing a transmission schedule of the queues, the scheduler shaping the transmission schedule by updating the schedule in the calendar in dependence on inputted traffic parameters of each queue, wherein the system includes an amplifier to amplify traffic-rate related parameters by a factor K prior to input to the scheduler, the scheduler and calendar being adapted to operate using amplified parameters.

2. A traffic shaping device according to claim 1, further comprising a parameter memory arranged to store the amplified parameters as integers for input to the scheduler.

3. A traffic shaping device according to claim 2, in which the traffic-rate related parameters include quality of service parameters.

4. A traffic shaping device according to claim 2, in which the transmission schedule for a respective queue is updated after a transmission from the queue.

5. A traffic shaping device according to claim 4, in which the calendar comprises a linear array having a number of indices, each index corresponding to a transmission time and being capable of referencing a list of queues, queues referenced by a low value index being transmitted before queues referenced by a higher value index, wherein the updating of the transmission schedule comprises recalculation of the index to refer to the queue.

6. A traffic shaping device according to claim 5, in which the scheduler recalculates the index using leaky bucket shaping.

7. A traffic shaping device according to claim 6, in which the scheduler uses single leaky bucket shaping for queues having CBR class traffic.

8. A traffic shaping device according to claim 7, in which the traffic-rate related parameters comprise the inverse of respective queue's peak cell rate (1/PCR) and queue's cell delay variation tolerance (CDVT), the parameters being calculated as:

$$I = \text{Integer}\left\{\frac{LinkPCR[cells/s]}{QPCR[cells/s]} * K\right\}$$

$$L = \text{Integer}\{CDVT[sec] * LinkPCR * K\},$$

where LinkPCR is the PCR of the link and QPCR is the PCR of the respective queue.

9. A traffic shaping device according to claim 6, in which the scheduler uses dual leaky bucket shaping for queues having VBR class traffic.

10. A traffic shaping device according to claim 9, in which the traffic-rate related parameters for the first leaky bucket comprise the inverse of the respective queue's peak cell rate (1/PCR) and the queue's cell delay variation tolerance (CDVT), the parameters being calculated as:

$$I = \text{Integer}\left\{\frac{LinkPCR[cells/s]}{QPCR[cells/s]} * K\right\}$$

$$L = \text{Integer}\{CDVT[sec] * LinkPCR * K\},$$

and the traffic-rate related parameters for the second leaky bucket comprise the inverse of the respective queue's sustainable cell rate (1/SCR) and the sum of the queue's cell delay variation tolerance (CDVT) and burst tolerance(BT), the parameters being calculated as:

$$I = \text{Integer}\left\{\frac{LinkPCR[cells/s]}{QPCR[cells/s]} * K\right\}$$

$$L = \text{Integer}\{BT[sec] * LinkPCR * K\} + \text{Integer}\{CDVT[sec] * LinkPCR * K\}$$

where LinkPCR is the PCR of the link and QPCR is the PCR of the respective queue.

11. A traffic shaping device according to claim 5, further comprising a transmitter arranged to traverse the array from lowest index to highest traversing one index per transmission time, wherein the transmitter allows a queue to transmit if it is referenced by the index currently traversed.

12. A traffic shaping device according to claim 11, in which recalculation of the index results in the reference to the queue being moved to an index with a higher value.

13. A traffic shaping device according to claim 12, in which a recalculation resulting in an index value greater than the maximum index of the array is adjusted so as to wrap around the array.

14. A traffic shaping device according to claim 13, further comprising a memory for storing the number of transmission times passed since each queue's last transmission, the value being used as a traffic-rate related parameter input to the scheduler.

15. A traffic shaping device according to claim 1, comprising a Field Programmable Gate Array (FPGA).

16. A traffic shaping device according to claim 1, comprising an application specific integrated circuit (ASIC).

17. A traffic shaping method scheduling fixed size traffic elements from a number of queues for transmission on a link, each queue having associated traffic parameters, the method comprising the steps of:

storing a transmission schedule of the queues in a memory; and shaping the transmission schedule by updating the schedule in the calendar in dependence on inputted traffic parameters of each queue;

wherein the step of shaping includes the step of amplifying traffic-rate related parameters by a factor K, the memory and the shaping step being adapted to operate using amplified parameters.

18. A traffic shaping method according to claim 17, in which the amplified parameters are truncated as integers.

19. A traffic shaping method according to claim 17, in which the traffic-rate related parameters include quality of service parameters.

20. A traffic shaping method according to claim 17, in which the transmission schedule for a respective queue is updated after a transmission from the queue.

21. A traffic shaping method according to claim 17, in which the transmission schedule comprises a linear array having a number of indices, each index corresponding to a transmission time and being capable of referencing a list of queues, queues referenced by a low value index being transmitted before queues referenced by a higher value index, wherein the step of shaping includes the step of recalculating the value of the index that should refer to the queue.

22. A traffic shaping method according to claim 21, in which the step of shaping comprises leaky bucket shaping.

23. A traffic shaping method according to claim 22, in which single leaky bucket shaping is used for queues having CBR class traffic.

24. A traffic shaping method according to claim 23, in which the traffic-rate related parameters comprise the inverse of respective queue's peak cell rate (1/PCR) and queue's cell delay variation tolerance (CDVT), the parameters being calculated as:

$$I = \text{Integer}\left\{\frac{LinkPCR[cells/s]}{QPCR[cells/s]} * K\right\}$$

$$L = \text{Integer}\{CDVT[sec] * LinkPCR * K\},$$

where LinkPCR is the PCR of the link and QPCR is the PCR of the respective queue.

25. A traffic shaping method according to claim 22, in which dual leaky bucket shaping is used for queues having VBR class traffic.

26. A traffic shaping method according to claim 25, in which the traffic-rate related parameters for the first leaky bucket comprise inverse of the respective queue's peak cell rate (1/PCR) and queue's cell delay variation tolerance (CDVT), the parameters being calculated as:

$$I = \text{Integer}\left\{\frac{LinkPCR\,[cells/s]}{QPCR\,[cells/s]} * K\right\}$$

$L=\text{Integer}\{CDVT[\text{sec}]*\text{Link}PCR*K\}$, and the traffic-rate related parameters for the second leaky bucket comprise the inverse of the respective queue's sustainable cell rate (1/SCR) and the sum of the queue's cell delay variation tolerance (CDVT) and burst tolerance(BT), the parameters being calculated as:

$$I = \text{Integer}\left\{\frac{LinkPCR\,[cells/s]}{QPCR\,[cells/s]} * K\right\}$$

$L=\text{Integer}\{BT[\text{sec}]*\text{Link}PCR*K\}+\text{Integer}\{CDVT[\text{sec}]*\text{Link}PCR*K\}$ where LinkPCR is the PCR of the link and QPCR is the PCR of the respective queue.

27. A traffic shaping method according to claim 21, further comprising the step of traversing the array from the lowest index to the highest, traversing one index per transmission time, further comprising the step of allowing a queue to transmit if it is referenced by the index currently traversed.

28. A traffic shaping method according to claim 27, in which recalculation of the index results in the reference to the queue being moved to an index with a higher value.

29. A traffic shaping method according to claim 28, in which a recalculation resulting in an index value greater than the maximum index of the array is adjusted so as to wrap around the array.

30. A traffic shaping method according to claim 29, further comprising the step of storing the number of transmission times passed since each queue's last transmission, the value being used as a traffic-rate related parameter input.

31. A computer-readable medium, on which is stored a computer program of instructions for a processor for use in a packet switched communication system to schedule fixed size traffic elements from a number of queues for transmission on a link, each queue having associated traffic parameters, the program comprising, in combination:

means for causing the processor to store a transmission schedule of the queues in a memory; and means for causing the processor to shape the transmission schedule by updating the schedule in the calendar in dependence on inputted traffic parameters of each queue;

wherein the means for causing the processor to shape the schedule includes means for amplifying in the memory traffic-rate related parameters by a factor K, the means for causing the processor to shape the schedule being adapted to operate using amplified parameters.

32. A field programmable gate array for use in a packet switched communication system programmed to execute scheduling of fixed size traffic elements from a number of queues for transmission on a link, each queue having associated traffic parameters, the program comprising the steps of:

storing a transmission schedule of the queues in a memory; and shaping the transmission schedule by updating the schedule in the calendar in dependence on inputted traffic parameters of each queue;

wherein the step of shaping includes the step of amplifying traffic-rate related parameters by a factor K, the memory and the shaping step being adapted to operate using amplified parameters.

33. An application specific integrated circuit for use in a packet switched communication system configured to execute scheduling of fixed size traffic elements from a number of queues for transmission on a link, each queue having associated traffic parameters, the program comprising the steps of:

storing a transmission schedule of the queues in a memory; and shaping the transmission schedule by updating the schedule in the calendar in dependence on inputted traffic parameters of each queue;

wherein the step of shaping includes the step of amplifying traffic-rate related parameters by a factor K, the memory and the shaping step being adapted to operate using amplified parameters.

* * * * *